United States Patent Office 2,754,210

Patented July 10, 1956

2,754,210

LIGHT SENSITIVE COMPOSITION OF MATTER AND PHOTOGRAPHIC PROCESS

Stanley B. Elliott, Cleveland, Ohio, assignor to Ferro Corporation, Cleveland, Ohio, a corporation of Ohio No Drawing. Application July 16, 1953, Serial No. 368,503

16 Claims. (Cl. 95—7)

This invention relates as indicated to a new composition of matter and has more particular reference to photosensitive polymeric materials and method of making same.

It is well known to those skilled in the art that the formation of images in photosensitive compositions is dependent upon the degeneration of silver salts therein. In the photosensitive systems of the present invention the formation of images is not dependent upon the degeneration of silver salts as in the prior art, but is dependent upon materials which in the presence of Friedel-Crafts catalysts undergo chemical change by the action of light and/or heat to produce a change of color.

Therefore, it is a principal object of this invention to provide new compositions of matter which are photosensitive to actinic light.

Another object of this invention is to provide a photosensitive system which can be "developed" and "fixed" by light and heat alone.

Other objects will appear as the description proceeds.

To the accomplishment of the foregoing and related ends the invention then comprises the features hereinafter fully described and pointed out in the claims, the following description setting forth in detail certain illustrative embodiments of the invention, these being indicative, however, of but a few ways in which the principle of the invention may be employed.

Broadly stated this invention comprises a new composition of matter consisting essentially of an intimate admixture of:

(*a*) at least one organic material which in the presence of a Friedel-Crafts type catalyst and by the action of light and heat will change color;

(*b*) a Friedel-Crafts type catalyst cation progenitor; and (*c*) at least one material which comprises halogenated organic material which in the presence of actinic light will degrade and release halogen acid.

Since the compositions and processes of the present invention are different than ordinarily encountered by those skilled in the art of photosensitive materials the following definitions are offered so as to avoid any confusion that might arise:

Exposure: The treatment of the photosensitive composition under an actinic light source to produce a latent image.

Latent image: The area exposed to an actinic light source. The latent image may either be visible or invisible.

Development: The heat treatment of the latent image so as to make an invisible latent image apparent or to intensify a visible latent image.

Image: The visible area exposed to actinic light and then developed by heat.

Ground: The undeveloped area around the image.

Safety factor: The time between the appearance or intensification of the image and the darkening of the ground during the development operation.

Actinic light: The term actinic light as used in the present invention is meant to include any electro-magnetic wave in the range of X-ray up to infra-red.

In the foregoing broad statement the basic component (*a*) of the present composition has been defined as any organic which under Friedel-Crafts conditions will undergo chemical change to produce a change of color.

In other words the present invention is dependent entirely upon the color change produced in organic materials capable of forming sufficient conjugated double bonds to form visible color bodies or the color change produced by the condensing, chelating, degrading or other means of complexing organic compounds with existing conjugated double bonds.

In light of the foregoing broad statement component (*a*) may be a halogenated resin capable of dehydrohalogenation with the formation of sufficient conjugated double bonds to form visible color bodies. Thus the following resins may be used in the present invention:

Vinyl chloride polymers
Vinylidene chloride polymers
Vinyl chloride-vinylidene chloride copolymers
Vinyl chloride-vinyl acetate copolymers
Vinylidene chloride-vinyl acetate copolymers These compounds, which for practical purposes are polymers, must in addition contain a straight-chain of substantial length in the molecule so that upon dehydrohalogenation the molecule will contain at least 5 and preferably 10 or more conjugated double bonds. This requirement is met admirably by the vinyl chloride polymers and copolymers referred to above as well as halogenated polyethylene. For convenience in the identification of this class of materials, resort may be had to the term vinylogs as defined by R. S. Fuson in his "The Principals of Vinylogy," Chemical Review 16,1 (1935). Thus, these above discussed materials may be defined as polymers of vinylogous series which contain a straight chain of at least 5 and preferably 10 or more carbon atoms and which are halogenated to the extent so that upon dehydrohalogenation they will yield substituent groups having 5 and preferably 10 or more conjugated double bonds. Stated in another way, these materials are halogenated vinylogous resins. These resins all have the property of degrading by means of dehydrohalogenation when exposed to light and/or heat.

Or if desired component (*a*) may be any non-halogenated resinous or non-resinous polymeric material which in the presence of a Friedel-Crafts type catalyst under the influence of light and/or heat is able to undergo degradation with the formation of chromophore groups. I have found that any polymeric material which does not revert to its monomeric form can be degraded by the present process to produce a change of color.

Thus the following broad classes of polymeric materials are typical of the substances which are applicable to the present invention:

Polyvinyl acetate
Polyvinyl alcohol
Ethyl cellulose
Cellulose acetate
Alkyd resins
Polyamides
Methacrylate polymers
Cellulose (paper and cloth)

It is to be noted that the various genera of polymeric materials which fall under the above broad classes are meant to be included as materials which are applicable to the present invention.

Still further the component (a) may be those organic non-polymeric colors or non-polymeric color progenitors which are capable of condensing, chelating, degrading or in other ways complexing with Friedel-Crafts catalysts, or with other organic compounds in the presence of Friedel-Crafts catalysts such that the resulting complex formed under the influence of light and/or heat is of a different color than the original mixture of the components of the system.

By a color progenitor I mean any non-polymeric organic material capable of producing or changing color under the mechanism of the present invention. The following are examples of colors or color progenitors which by the mechanism of this invention are useful in producing photosensitive compositions:

Carbanthrene Blue RS azine
1,4-naphthoquinone
2-hydroxy-1,4-naphthoquinone
Anthraquinone-2-carboxy acid
Alizarin
Anthraquinone
2-methyl anthraquinone
Dehydroindigo disulfate
Dinaphtho-(2;3-2,3) (1″,2″-5,4) furan 1,4-quinone
1,2′-hydroxy-benzoylamino anthraquinone
Triphenyl tetrazolium chloride
2-methyl-1-nitro anthraquinone
4,4′-dichlorostilbene
2,2′-dichlorostilbene
4,4′-diaminostilbene-2,2′ disulfo acid
4-amino-4′ acetylamino-2-nitrostilbene
1,2-dibenzoyl chlorethane
1,2-dibenzoyl-1,2-dichloroethane
1-amino-2-methoxy-4-hydroxy anthraquinone
1,4-dihydroxy-naphthalene
2,3-dichlor-1,4 naphthaquinone Thus, I propose that this invention cover those organic materials capable of condensing, chelating, degrading or in other ways complexing with Friedel-Crafts catalysts, or with other organic compounds in the presence of Friedel-Crafts catalysts such that the resulting complex formed under the influence of light and/or heat is of a different color than the original mixture of the components of the system.

In the broad statement of the invention, component (b) has been defined as a Friedel-Crafts type cation progenitor which in the presence of light and/or heat promotes the chemical change of component (a). The materials which are used for this purpose are not required in stoichiometric amounts to combine with component (a), consequently component (b) serves catalytically to promote the chemical change in component (a).

As is well-known to those skilled in the art, that while aluminum chloride is the best known of the Friedel-Crafts type catalysts many other metal halides are also known and used as Friedel-Crafts type catalysts. Among those that may be listed as the more important Friedel-Crafts type catalysts are the halides of iron, antimony, zinc, tin, titanium, zirconium, beryllium, boron, cadmium and bismuth. The Friedel-Crafts cation progenitors are any organic or inorganic salts which contain, for example any of the above mentioned cations and which in the presence of halide ions will form Friedel-Crafts type catalysts by reaction with the halide ions. The following Friedel-Crafts cation progenitor compounds are illustrative of materials which have been found to be especially useful in the present invention:

Zinc acetate
Zinc laurate
Zinc naphthenate
Zinc stearate
Zinc oleate
Cadmium naphthenate
Cadmium stearate
Cadmium laurate
Cadmium sulfate
Aluminum acetate Zinc 2-ethyl hexoate
Zinc oxide
Zinc sulfate
Zinc sulfide
Cadmium acetate
Cadmium oxide
Aluminum chlorolaurate
Bismuth naphthenate
Antimony naphthenate
Beryllium stearate
Iron naphthenate
Iron oleate When the color material is intimately admixed with a catalyst cation progenitor and a catalyst anion progenitor and then exposed to actinic light, the anion progenitor undergoes dehydro-halogenation and the released halide ions react with the surrounding cation progenitor to form a Friedel-Crafts type catalyst. Thus there is formed, in the light struck area, the Friedel-Crafts type catalyst, while the surrounding non-light exposed area contains only the catalyst progenitors. Then when the composition is subjected to the heat development operation, the light struck area undergoes chemical change due to the presence of the Friedel-Crafts catalyst while the non-light struck area remains relatively unchanged in color until the cation progenitor is converted to the active catalyst. However, the heating is stopped before the cation progenitor is converted to the active catalyst in sufficient concentration to cause color change and thus the resultant image is distinct from the ground.

The concentration of the Friedel-Crafts cation progenitor may vary from about 0.1 part per 1 part of component (a) to about 50 parts per 1 part of component (a).

The anion progenitor as previously mentioned in the aforegoing broad statement is any organic halogenated compound which degrades in the presence of actinic light to release halide ions, or in other words Friedel-Crafts catalyst anions. Thus when the photosensitive systems of the present invention are exposed to actinic light the Friedel-Crafts anion progenitor degrades to release halide ions. These halide ions in turn react with the Friedel-Crafts cation progenitors to form Friedel-Crafts type catalysts. The thus formed catalysts then catalyze the chemical change in the color material.

It is important to note here that the halogen releasing material may be component (a) itself or it may be another halogenated organic substance which releases halogen ions in the presence of actinic light. For example if the photosensitive composition contains polyvinyl chloride as the color material then it is not necessary to add another halogen liberating substance to form the Friedel-Crafts type catalyst. However, if the color material is a dye or some other non-halogen containing material then it is necessary to add a halogenated compound to furnish Friedel-Crafts anions to react with the Friedel-Crafts cation progenitor to form the Fridel-Crafts type catalyst. In addition a halogen liberating material may be used along with the various halogenated resins.

Thus compounds of high light instability or halogen acid instability, which may or may not give color in themselves, may be used as the source of halogen acid for conversion of a Friedel-Crafts cation progenitor to a Friedel-Crafts type catalyst. Such materials as chlorinated paraffins, chlorinated rubber, alpha chlorostyrene and beta chlorostyrene readily release their halogens when exposed to actinic light and are thus particularly useful in the present invention.

The following materials are illustrative of the types of organic compounds which serve as Friedel-Crafts anion progenitors.

Parachlor benzaldehyde
Dichloropropylene
Hexachloroethane
Trichloroethane
Octachloropropane
Alphachlor acrylic acid
Halogenated vegetable oils (linseed, cottenseed, soyabean)
Halogenated rubber
Halogenated paraffins
Tetraiodoethane
Halogenated fatty acids (stearic, lauric)

If the photosensitive composition contains a halogenated substance other than component (*a*) then the ratio of Friedel-Crafts anion progenitor may vary from about 0.5 part per 1 part of component (*a*) to about 100 parts per 1 part of component (*a*).

The following examples are used to illustrate various formulations using different components *a*, *b* and *c*. All of these formulations produced exact positives of the negative which was used to mask the film. The possible combinations of the various components *a*, *b* and *c* are innumerable. Therefore, it is to be remembered that the examples given herein are only illustrative of the many possible ones.

I 50 grams polyvinyl chloride
4 grams zinc oxide
20 grams dioctyl phthalate
10 grams diluent It will be noted that in the foregoing and subsequent examples a diluent is used when admixing the ingredients of the photosensitive systems. Depending on the preferred mechanical handling of the film, it may prove desirable to prepare either a plastisol, organosol, or a solution type of coating. While a diluent has been used in the various examples it is not a necessary part of the formulation since if it is desired to make a plastisol no diluent is used. An organosol would have an inactive type diluent, such as, a paraffinic type hydrocarbon and a solution would make use of a true solvating diluent such as a ketone. In every case the ratio of ingredients must be adjusted to produce the desired workable viscosity.

The above ingredients were thoroughly mixed and then poured onto a plate and a 4 mil film drawn down. The film was then cured at about 350° F. for about 1 minute. Although a cure time is not essential to the mechanism of the invention, the film is cured so that it will not be sticky and thus facilitate handling. The film was then masked with a negative and exposed for about 2 minutes to an actinic light source of 120 milliwatts per square centimeter of surface. The exposed film was then heat developed at 320° F. for about 15 minutes. The finished film was a clear and positive picture of the negative.

The same procedure as discussed in Example I was repeated using different resins, such as, vinyl chloride ester copolymer, vinyl chloride-vinylidene copolymer resin, polyvinylidene chloride resin, etc. All of the resins worked in the presence of the zinc oxide.

II 50 grams polyvinyl chloride
10 grams cadmium naphthenate
20 grams dioctyl phthalate
10 grams diluent A film was made and treated as in Example I with the same results noted. The same formulation was also repeated using different resins as noted above. All of the resins worked in the presence of the cadmium naphthenate.

III 50 grams polyvinyl chloride
5 grams aluminum chlorolaurate
20 grams dioctyl phthalate
10 grams diluent A film was made and treated as in the foregoing examples with the same results noted. The same formulation was also repeated using different resins as noted above.

IV 50 grams polyvinyl chloride
5 grams iron naphthenate
20 grams dioctyl phthalate
10 grams diluent A film was made and treated as in the foregoing examples with the same results noted. The same formulation was also repeated using different resins as noted above.

In the foregoing and some of the following examples it will be seen that a plasticizer (dioctyl phthalate) is used. It is to be understood that the plasticizer is not a necessary material to produce the photosensitive compositions of this invention. It is only used to obtain the type of film desired. A choice of plasticizers or mixtures of plasticizers is possible and the choice and amount is substantially dependent upon the physical properties desired in the final film. The following materials are typical examples of plasticizers which may be used.

Dioctyl phthalate
Tricresyl phosphate
Tributyl cellosolve phosphate
Triethylene glycol di-2, ethyl hexoate
Di-2, ethyl hexyl adipate The following examples illustrate the extreme variation of plasticizer usable in the present invention.

V 50 grams polyvinyl chloride
50 grams diluent
0 grams plasticizer
4 grams zinc oxide

VI 50 grams polyvinyl chloride
10 grams diluent
100 grams dioctyl phthalate
4 grams zinc oxide In both examples a good image was obtained. In the case of Example V the film was dry and brittle and in the case of Example VI the film was very soft and pliable.

VII 50 grams polyvinyl chloride
4 grams zinc naphthenate
5 grams hexachloroethane
20 grams dioctyl phthalate
10 grams diluent A film was made and treated as in the foregoing examples with the same results noted. The same formulation was also repeated using diffrent resins as noted above.

VIII 50 grams polyvinyl chloride
10 grams cadmium naphthenate
2 grams halogenated linseed oil
20 grams dioctyl phthalate
10 grams diluent A film was made and treated as in the foregoing examples with the same results as noted above. The same formulation was also repeated using different resins.

IX 50 grams polyvinyl chloride
5 grams aluminum chlorolaurate
10 grams chlorinated paraffin
15 grams dioctyl phthalate
10 grams diluent A film was made and treated as in the foregoing examples with the same results noted. The same formulation was also repeated using different resins as noted above.

X 50 grams polyvinyl chloride
5 grams iron naphthenate
5 grams halogenated stearic acid
20 grams dioctyl phthalate
10 grams diluent A film was made and treated as in the foregoing examples with the same results noted. The same formulation was also repeated using different resins.

XI 20 grams ethyl cellulose
60 grams benzene
20 grams alcohol
5 grams chlorinated paraffin
5 grams zinc naphthenate The components of the above formulation were thoroughly mixed until a smooth solution was obtained and then films were drawn down on panels and allowed to air dry. The dried films were then masked and exposed as in the foregoing examples.

The following examples, in addition to Example XI above, are illustrative of photosensitive compositions containing polymeric materials other than halogenated resins which are able to undergo degradation in the presence of a Friedel-Crafts catalyst with the formation of chromophore groups.

XII 20 grams cellulose acetate
80 grams butyl acetate
10 grams chlorinated paraffin
5 grams zinc oxide

XIII 20 grams alkyd resin
80 grams mineral spirits
5 grams chlorinated paraffin
5 grams zinc naphthenate

XIV 20 grams polyvinyl acetate
80 grams butyl acetate
3 grams halogenated linseed oil
10 grams cadmium naphthenate

XV 20 grams polyvinyl alcohol
80 grams alcohol
5 grams chlorinated rubber
5 grams aluminum chlorolaurate

XVI 50 grams mineral spirits
5 grams chlorinated paraffin
5 grams zinc naphthenate A solution of the chlorinated paraffin and zinc naphthenate was made in mineral spirits and used to treat paper. The resulting dried, treated paper contained 5 parts of chlorinated paraffin and 5 parts of zinc naphthenate per 50 parts of paper. The treated paper was then masked, exposed to actinic light and finally heat developed, resulting in an image in the paper.

The following examples illustrate the use of non-polymeric materials as component (*a*). In these examples the image produced is dependent upon the color change produced in a non-polymeric color forming material. In other words I can produce color change in a test tube without the presence of any polymeric or film forming materials. I use the polymeric or film forming materials in the following examples primarily as a carrier for the color material (component *a*). However, when I incorporate the basic photosensitive components in a polymeric or film forming carrier in numerous instances this latter material may afford intensification of the color change.

XVII 50 grams vinyl chloride resin
10 grams chlorinated paraffin
40 grams diluent
3 grams zinc oxide
3 grams anthraquinone The components were thoroughly mixed and treated as in Example XI. The finished film was a clear and exact positive of the negative, the image being brown and the ground yellow.

XVIII 20 grams polystyrene
80 grams solvent
10 grams chlorinated rubber
5 grams zinc naphthenate
1 gram alizarin The resultant film had a red image and a light orange ground.

XIX 20 grams ethyl cellulose
80 grams solvent
5 grams halogenated linseed oil
5 grams cadmium naphthenate
2 grams carbanthrene Blue RS azine The resultant film gave a green image and a yellow ground.

XX 50 grams mineral spirits
5 grams chlorinated paraffin
5 grams zinc naphthenate
4 grams 4,4 dichlorostilbene A solution of the chlorinated paraffin and zinc naphenate was made in the mineral spirits and used to treat paper. The resulting dried, treated paper contained 5 parts of chlorinated paraffin, 4 parts of color material and 5 parts of zinc naphthenate per 50 parts of paper. The treated paper was then masked, exposed to actinic light and finally heat developed, resulting in a brown image on a yellow ground.

In all of the aforegoing examples, I use an exposure of about 2 minutes to an actinic light source of 120 milliwatts per square centimeter of surface. It is to be understood that this exposure is only illustrative of how the photosensitive systems may be exposed. It is entirely within the contemplation of this invention to produce latent images in my photosensitive systems using an exposure time of 1 thousandth of a second with an actinic light source on the order of two milliwatts per square centimeter of exposed surface.

The exposure of the photosensitive systems of this invention may be carried out under any source of electromagnetic waves in the range of X-ray up to infra-red.

The development of the latent image may be carried out in a temperature range of from about 200° F. to about 500° F. for about 1 to about 60 minutes.

In instances where resinous materials are used as the film carrier, plasticizers may be used if desired. The choice and amount of plasticizer is substantially dependent upon the physical properties desired in the final film.

It is necessary that the several components of the system be thoroughly and uniformly admixed. Several possible methods of accomplishing this are as follows:

(*a*) If the catalytic agents are soluble in the system they may be added directly to the other components and mixed by mechanical agitation.

(*b*) The catalytic agents, if insoluble in the composition, may be mixed and ground into the composition on a three roll paint mill or other similar type mill.

(*c*) The catalytic agents may be dissolved in any suitable liquid. If the polymeric material is a resinous film or a cellulosic sheet the solution of the catalytic agents may then be deposited on the surface thereof and allowed to soak down.

The photosensitive systems of this invention can be further modified by the addition of (*a*) agents which intensify color of the light struck areas, and (*b*) agents which improve the production of half-tones.

(*a*) To intensify the color of the light struck areas, inorganic salts of such materials as cobalt, manganese and copper may be used.

(*b*) Chemical or physical barriers within the systems described will improve half-tone reproductions. The migration of hydrogen halides and Friedel-Crafts catalytically active molecules are controlled by these spacers or barriers and thus limit the chemical change of the color material to those areas actually exposed to the actinic light source.

Any finely divided inert solid particles, such as, mica, talc, silica, diatomaceous earth and titanium dioxide may be used in amounts varying from about 1% to about 50% of the weight of the polymeric film carrier, as "physical barriers" or "spacers" to improve the production of half-tones in the photosensitive compositions herein disclosed. For example 13 grams of silica added to Example XVII greatly improved the half-tone reproduction.

Active pigments, such as, calcium carbonate, basic lead sulfate, etc. may be used as "chemical spacers" in the aforegoing compositions to improve the production of half-tones. For example, in a system such as disclosed in Example XVII calcium carbonate may be added instead of silica. Any halogen acid liberated during development which does not react with the cation catalyst progenitor, will be taken up by chemical reaction with the calcium carbonate. The "chemical spacers" may be used in the same amounts as the aforegoing "physical spacers."

Other modes of applying the principle of the invention may be employed provided the features stated in any of the following claims or the equivalent of such be employed.

I, therefore, particularly point out and claim as my invention:

1. A composition of matter comprising an intimate admixture of: (A) A material selected from the class consisting of hydroxyl and amino free unsaturated cyclic 1,4 diketones, alkyl substituted hydroxyl and amino free unsaturated cyclic 1,4 diketones and halogen substituted hydroxyl and amino free unsaturated cyclic 1,4 diketones; (B) A polymeric alkenyl chloride having at least 10 carbon atoms with at least one chlorine on every other carbon atom; and (C) A material selected from the class consisting of the metal oxides, metal salts of weak inorganic acids and metal salts of carboxylic acids, the metals therein being selected from the class consisting of aluminum, iron, antimony, zinc, tin, titanium, zirconium, beryllium, cadmium and bismuth.

2. A composition of matter comprising an intimate admixture of: (A) A material selected from the class consisting of hydroxyl and amino free unsaturated cyclic 1,4 diketones, alkyl substituted hydroxyl and amino free unsaturated cyclic 1,4 diketones and halogen substituted hydroxyl and amino free unsaturated cyclic 1,4 diketones; (B) A polymeric alkenyl chloride having at least 10 carbon atoms with at least one chlorine on every other carbon atom; and (C) A material selected from the class consisting of the metal oxides, metal salts of weak inorganic acids and metal salts of carboxylic acids, the metals therein being selected from the class consisting of aluminum, iron, antimony, zinc, tin, titanium, zirconium, beryllium, cadmium and bismuth; and (D) A halogen free polymeric material which in the presence of actinic light and heat does not revert to its monomeric form said polymeric material selected from the class consisting of polyvinyl acetate, polyvinyl alcohol, ethyl cellulose, cellulose acetate, alkyds, polyamides, methacrylates and cellulose.

3. A composition of matter comprising an intimate admixture of: (A) A material selected from the class consisting of hydroxyl and amino free unsaturated cyclic 1,4 diketones, alkyl substituted hydroxyl and amino free unsaturated cyclic 1,4 diketones and halogen substituted hydroxyl and amino free unsaturated cyclic 1,4 diketones; (B) A polymeric alkenyl chloride having at least 10 carbon atoms with at least one chlorine on every other carbon atom; (C) A material selected from the class consisting of the metal oxides, metal salts of weak inorganic acids and metal salts of carboxylic acids, the metals therein being selected from the class consisting of aluminum, iron, antimony, zinc, tin, titanium, zirconium, beryllium, cadmium and bismuth; (D) A halogen free polymeric material which in the presence of actinic light and heat does not revert to its monomeric form said polymeric material selected from the class consisting of polyvinyl acetate, polyvinyl alcohol, ethyl cellulose, cellulose acetate, alkyds, polyamides, methacrylates and cellulose; and (E) A material selected from the class consisting of talc, mica, silica, diatomaceous earth, titanium dioxide, calcium carbonate, and basic lead sulfate.

4. A composition of matter comprising an intimate admixture of: (A) A material selected from the class consisting of hydroxyl and amino free unsaturated cyclic 1,4 diketones, alkyl substituted hydroxyl and amino free unsaturated cyclic 1,4 diketones and halogen substituted hydroxyl and amino free unsaturated cyclic 1,4 diketones; (B) A polymeric alkenyl chloride having at least 10 carbon atoms with at least one chlorine on every other carbon atom; (C) A material selected from the class consisting of the metal oxides, metal salts of weak inorganic acids and metal salts of carboxylic acids, the metals therein being selected from the class consisting of aluminum, iron, antimony, zinc, tin, titanium, zirconium, beryllium, cadmium and bismuth; (D) A halogen free polymeric material which in the presence of actinic light and heat does not revert to its monomeric form said polymeric material selected from the class consisting of polyvinyl acetate, polyvinyl alcohol, ethyl cellulose, cellulose acetate, alkyds, polyamides, methacrylates and cellulose; (E) A material selected from the class consisting of talc, mica, silica, diatomaceous earth, titanium dioxide, calcium carbonate, and basic lead sulfate; and (F) A plasticizer of the type commonly employed with halogenated vinyl resins.

5. A composition of matter comprising an intimate admixture: (A) 1,4, naphthoquinone; (B) Polyvinyl chloride; and (C) Zinc oxide.

6. A composition of matter comprising an intimate admixture of: (A) 1,4, nahthoquinone; (B) Polyvinyl chloride; (C) Zinc oxide; and (D) Titanium dioxide.

7. A composition of matter comprising an intimate admixture of: (A) 1,4, naphthoquinon; (B) Polyvinyl chloride; (C) Zinc oxide; (D) Titanium dioxide; and (E) Dioctyl phthalate.

8. A composition of matter comprising an intimate admixture of: (A) Tetrachloro 1,4 benzoquinone; (B) Chlorinated rubber; and (C) Zinc oxide.

9. The process of making photographic images which comprises exposing a photosensitive system in such a manner so as to create a light intensity gradient such that the area receiving maximum actinic light is exposed to about 2 milliwatts per square centimeter for one-thousandth of a second, said photosensitive system consisting essentially of an intimate admixture of: (A) A material selected from the class consisting of hydroxyl and amino free unsaturated cyclic 1,4 diketones, alkyl substituted hydroxyl and amino free unsaturated cyclic 1,4 diketones and halogen substituted hydroxyl and amino free unsaturated cyclic 1,4 diketones; (B) A polymeric alkenyl chloride having at least 10 carbon atoms with at least one chlorine on every other carbon atom; and (C) A material selected from the class consisting of the metal oxides, metal salts of weak inorganic acids and metal salts of carboxylic acids, the metals therein being selected from the class consisting of aluminum, iron, antimony, zinc, tin, titanium, zirconium, beryllium, cadmium and bismuth; and thereafter submitting said system to a temperature of from about 200° F. to about 500° F. for a period of from about 1 minute to about 60 minutes.

10. The process of making photographic images which comprises exposing a photosensitive system in such a manner so as to create a light intensity gradient such that the area receiving maximum actinic light is exposed to about 2 milliwatts per square centimeter for one-thousandth of a second, said photosensitive system consisting essentially of an intimate admixture of: (A) A material selected from the class consisting of hydroxyl and amino free unsaturated cyclic 1,4 diketones, alkyl substituted hydroxyl and amino free unsaturated cyclic 1,4 diketones and halogen substituted hydroxyl and amino free unsaturated cyclic 1,4 diketones; (B) A polymeric alkenyl chloride having at least 10 carbon atoms with at least one chlorine on every other carbon atom; (C) A material selected from the class consisting of metal oxides, metal salts of weak inorganic acids and metal salts of carboxylic acids, the metals therein being selected from the class consisting of aluminum, iron, antimony, zinc, tin, titanium, zirconium, beryllium, cadmium and bismuth; and (D) A halogen free polymeric material which in the presence of actinic light and heat does not revert to its monomeric form said polymeric material selected from the class consisting of polyvinyl acetate, polyvinyl alcohol, ethyl cellulose, cellulose acetate, alkyds, polyamides, methacrylates and cellulose; and thereafter submitting said system to a temperature of from about 200° F. to about 500° F. for a period of from about 1 minute to about 60 minutes.

11. The process of making photographic images which comprises exposing a photosensitive system in such a manner so as to create a light intensity gradient such that the area receiving maximum actinic light is exposed to about 2 milliwatts per square centimeter for one-thousandth of a second, said photosensitive system consisting essentially of an intimate admixture of: (A) A material selected from the class consisting of hydroxyl and amino free unsaturated cyclic 1,4 diketones, alkyl substituted hydroxyl and amino free unsaturated cylic 1,4 diketones and halogen substituted hydroxyl and amino free unsaturated cyclic 1,4 diketones; (B) A polyeric alkenyl chloride having at least 10 carbon atoms with at least one chlorine on every other carbon atom; (C) A material selected from the class consisting of the metal oxides, metal salts of weak inorganic acids and metal salts of carboxylic acids, the metals therein being selected from the class consisting of aluminum, iron, antimony, zinc, tin, titanium, zirconium, beryllium, cadmium and bismuth; (D) A halogen free polymeric material which in the presence of actinic light and heat does not revert to its monomeric form said polymeric material selected from the class consisting of polyvinyl acetate, polyvinyl alcohol, ethyl cellulose, cellulose acetate, alkyds, polyamides, methacrylates and cellulose; and (E) A material selected from the class consisting of talc, mica, silica, diatomaceous earth, titanium dioxide, calcium carbonate, and basic lead sulfate; and thereafter submitting said system to a temperature of from about 200° F. to about 500° F. for a period of from about 1 minute to about 60 minutes.

12. The process of making photographic images which comprises exposing a photosensitive system in such a manner so as to create a light intensity gradient such that the area receiving maximum actinic light is exposed to about 2 milliwatts per square centimeter for one-thousandth of a second, said photosensitive system consisting essentially of an intimate admixture of: (A) A material selected from the class consisting of hydroxyl and amino free unsaturated cyclic 1,4 diketones, alkyl substituted hydroxyl and amino free unsaturated cyclic 1,4 diketones and halogen substituted hydroxyl and amino free unsaturated cyclic 1,4 diketones; (B) A polymeric alkenyl chloride having at least 10 carbon atoms with at least one chlorine on every other atom; (C) A material selected from the class consisting of the metal oxides, metal salts of weak inorganic acids and metal salts of carboxylic acids, the metals therein being selected from the class consisting of aluminum, iron, antimony, zinc, tin, titanium, zirconium, beryllium, cadmium and bismuth; (D) A halogen free polymeric material which in the presence of actinic light and heat does not revert to its monomeric form said polymeric material selected from the class consisting of polyvinyl acetate, polyvinyl alcohol, ethyl cellulose, cellulose acetate, alkyds, polyamides, methacrylates and cellulose; (E) A material selected from the class consisting of talc, mica, silica, diatomaceous earth, titanium dioxide, calcium carbonate, and basic lead sulfate; and (F) A plasticizer of the type commonly employed with halogenated vinyl resins; and thereafter submitting said system to a temperature of from about 200° F. to about 500° F. for a period of from about 1 minute to about 60 minutes.

13. The process of making photographic images which comprises exposing a photosensitive system in such a manner so as to create a light intensity gradient such that the area receiving maximum actinic light is exposed to about 2 milliwatts per square centimeter for one-thousandths of a second, said photosensitive system consisting essentially of an intimate admixture of: (A) 1,4, naphthoquinone; (B) Polyvinyl chloride; (C) Zinc oxide; and thereafter submitting said system to a temperature of from about 200° F. to about 500° F. for a period of from about 1 minute to about 60 minutes.

14. The process of making photographic images which comprises exposing a photosensitive system in such a manner so as to create a light intensity gradient such that the area receiving maximum actinic light is exposed to about 2 milliwatts per square centimeter for one-thousandth of a second, said photosensitive system consisting essentially of an intimate admixture of: (A) 1,4, naphthoquinone; (B) Polyvinyl chloride; (C) Zinc oxide; and (D) Titanium dioxide; and thereafter submitting said system to a temperature of from about 200° F. to about 500° F. for a period of from about 1 minute to about 60 minutes.

15. The process of making photographic images which comprises exposing a photosensitive system in such a manner so as to create a light intensity gradient such that the area receiving maximum actinic light is exposed to about 2 milliwatts per square centimeter for one-thousandth of a second, said photosensitive system consisting essentially of an intimate admixture of: (A) 1,4, naphthoquinone; (B) Polyvinyl chloride; (C) Zinc oxide; (D) Titanium dioxide; and (E) Dioctyl phthalate; and thereafter submitting said system to a temperature of from about 200° F. to about 500° F. for a period of from about 1 minute to about 60 minutes.

16. The process of making photographic images which comprises exposing a photosensitive system in such a manner so as to create a light intensity gradient such that the area receiving maximum actinic light is exposed to about 2 milliwatts per square centimeter for one-thousandth of a second, said photosensitive system consisting essentially of an intimate admixture of: (A) Tetrachloro 1,4 benzoquinone; (B) Chlorinated rubber; and (C) Zinc oxide; and thereafter submitting said system to a temperature of from about 200° F. to about 500° F. for a period of from about 1 minute to about 60 minutes.

References Cited in the file of this patent

UNITED STATES PATENTS

| | | |
|---|---|---|
| 1,587,274 | Beebe et al. | June 1, 1926 |
| 1,604,674 | Beebe et al. | Oct. 26, 1926 |
| 2,099,297 | Clement | Nov. 16, 1937 |
| 2,463,983 | Leatherman | Mar. 8, 1949 |
| 2,475,626 | Leatherman | July 12, 1949 |
| 2,484,529 | Roedel | Oct. 11, 1949 |
| 2,599,581 | Perkins et al. | June 10, 1952 |